(12) United States Patent
Anthony

(10) Patent No.: US 6,325,215 B1
(45) Date of Patent: Dec. 4, 2001

(54) METHOD AND APPARATUS FOR SEPARATING ELASTOMERIC PARTICULATES AND FIBERS FROM A PULVERIZED MIXTURE

(75) Inventor: William S. Anthony, Greenville, MS (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/287,300

(22) Filed: Apr. 7, 1999

(51) Int. Cl.$^7$ ........................................................ B07B 9/00
(52) U.S. Cl. .............................. 209/21; 209/29; 209/283; 209/389; 209/393
(58) Field of Search .................................. 209/21, 28, 29, 209/36, 37, 234, 254, 281, 283, 389, 386, 390, 393, 930

(56) References Cited

U.S. PATENT DOCUMENTS

| | | |
|---|---|---|
| 1,321,201 | 11/1919 | Young . |
| 2,729,856 | 1/1956 | Horton et al. . |
| 2,872,041 * | 2/1959 | Fontein et al. .................... 209/393 X |
| 4,422,581 | 12/1983 | Chryst .................................... 241/66 |
| 4,601,819 * | 7/1986 | Pellhammer et al. ........... 209/283 X |
| 4,915,671 * | 4/1990 | Johnson ............................. 209/283 X |
| 5,019,242 * | 5/1991 | Donelson ................................. 209/29 |
| 5,098,557 * | 3/1992 | Hirschler et al. ....................... 209/29 |
| 5,232,097 * | 8/1993 | Tohkala ............................. 209/672 X |
| 5,362,001 | 11/1994 | Gohlisch ............................... 241/160 |
| 5,785,263 | 7/1998 | Wu et al. ................................. 241/79 |

FOREIGN PATENT DOCUMENTS

1776457 * 11/1992 (SU) ....................................... 209/29

* cited by examiner

Primary Examiner—Tuan N. Nguyen
(74) Attorney, Agent, or Firm—M. Howard Silverstein; Joseph A. Lipovsky; John D. Fado (57) ABSTRACT

A method and apparatus for separating elastomeric particulates from a pulverized mixture wherein a first separator assembly separates out substantially clean fiber and passes non-fibrous particulates and residual fiber to a second separator assembly that separates out substantially clean non-fibrous particulates. The method includes propelling the pulverized mixture under a plurality of first separator cylinders with mixture-engaging structure and against a structure for removing non-fibrous particulates and residual fibers from the pulverized mixture. The non-fibrous particulates and residual fibers are propelled under a plurality of second separator cylinders that include centrifugally releasable mixture-engaging structures and against a structure for separating non-fibrous particulates from the residual fibers.

20 Claims, 6 Drawing Sheets

METHOD AND APPARATUS FOR SEPARATING ELASTOMERIC PARTICULATES AND FIBERS FROM A PULVERIZED MIXTURE

BACKGROUND OF THE INVENTION

1. Field of the Invention

The present invention relates to an improved method and apparatus for separating non-fibrous particulates from fibers. More particularly, the present invention provides an improved method and apparatus for separating entrained and/or adherent elastomeric particulates, such as crumb rubber, from fibers such as nylon or polyester.

2. Description of the Prior Art

The disposal of discarded rubber vehicle tires, especially for cities, states and industries throughout the United States, has been a problem ever since transportation first began to use tires. Billions of discarded tires occupy landfills and stockpiles, which as they have grown, governmental and corporate bodies have worked to reduce. Some states charge disposal fees and/or sales surcharges of $1.00 to $2.00 per tire.

Indiscriminate discarding of rubber vehicle tires poses environmental and health problems. Waste tires provide breeding grounds for insects and rodents, and are not biodegradable. Further, their geometry being that of a noncompactable hollow toroid shape is voluminous and brings about the premature filling of dump sites.

The difficulty of discarding worn out rubber tires has led to investment in disposal technologies related to either volumetric reduction or material recycling. Recycling of rubber tires is difficult because of problems associated with their multi-component non-homogenous construction. A tire typically comprises rubber tread and sidewalls reinforced with enmeshed layers of steel wire and reinforcing fabric. Further, the rubber is usually vulcanized resulting in a toughness for the tire that contributes to its associated indestructibility.

The majority of the techniques used to recover recyclable components from waste tires requires initial physical processing, such as shredding or cryogenic pulverization, followed by further refining by some secondary process, such as converting the materials into a reusable form by chemical digestion, mechanical reclamation, destructive distillation, etc. In cryogenic crushing or pulverizing, liquid nitrogen is used to lower the temperature of the tire to about −300 degrees Fahrenheit. At such low temperatures, rubber hardens and is easily fractured into tiny granules or particulates, leaving steel wire and reinforcing fibers relatively unaffected. The steel wire is removed by electromagnetics and the reinforcing fibers are removed by sieving. The cost of cryogenic processing is relatively high, and typically suffers from inadequate recovery of rubber. The remaining rubber granules and fibers are usually disposed of in landfills.

In a related co-pending patent application Ser. No. 09/107,760, filed on Jun. 30, 1998 and entitled "A Method for Separating Elastomeric Particulates from Fiber", a method is disclosed for separating non-fibrous particulates from fibers by contacting a pulverized mixture with a plurality of revolving mixture-engaging structures to cause the revolving mixture-engaging structures to engage the fibers and separate the fibers from the non-fibrous particulates. The produced non-fibrous particulates typically contain residual fibers which are removed in a reclaiming zone containing a saw cylinder, a doffing brush cylinder, and a cylinder with protruding rods. The method disclosed in patent application Ser. No. 09/107,760 has limited capabilities of recovering both non-fibrous particulates and fibers.

Therefore, what is needed and what has been invented is an improved method for separating and recovering a higher percentage of both non-fibrous particulates and fibers from a pulverized mixture without the deficiencies associated with the prior art in recovering recyclable components from waste tires. What is further needed and what has been invented is an improved, inexpensive and effective method for recovering rubber particulates from a pulverized tire mixture. What is also further needed and what has been invented is an improved method for separating particulate rubber (e.g., crumb rubber) from fibers (e.g., polyester or nylon fibers).

SUMMARY OF THE INVENTION

The present invention accomplishes its desired objects by broadly providing a method for separating non-fibrous particulates from fibers comprising:

(a) providing a pulverized mixture or composition comprising non-fibrous particulates (e.g., crumb rubber or the like) adhered and/or mixed with fibers (e.g., polyester or nylon fibers, or the like);

(b) introducing the pulverized composition into a first separation zone containing a plurality of revolving mixture-engaging structures so as to separate the fibers from the non-fibrous particulates and thereby produce a flowstream of partially cleaned non-fibrous particulates and a flowstream of residual fibers; and (c) introducing the flowstream of partially cleaned non-fibrous particulates into a second separation zone containing at least two contiguous revolving cylinder assemblies comprising centrifugally releasable fiber-engaging structures to further separate the remaining fibers therefrom. The partially cleaned non-fibrous particulates produced in the first separation zone represent over about 90% by weight of the non-fibrous particulates from the pulverized mixture. The partially cleaned non-fibrous particulates produced in the second separation zone after the residual fibers have been separated therefrom by the fiber-engaging structures represent over about 95% by weight of the non-fibrous particulates from the pulverized mixture. Typically, at least some of the fibers are adhered to the non-fibrous particulates. "Centrifugally releasable fiber-engaging structures" broadly means, and not by way of any limitation, any structure that is capable of engaging any substance, mixture, component(s), or any of the like, and releasing, propelling, or impelling the same because of or due to centrifugal force caused by the revolving or rotating cylinder assemblies. As the cylinder assemblies rotate, a centrifugal force is outwardly exerted on any substance, mixture, component(s), or any of the like, from the center of rotation of the cylinder assemblies, and the "centrifugally releasable fiber-engaging structures" are possessed with a structure having a geometric shape or configuration that allows, or is capable of allowing, any substance, mixture, component(s), or any of the like, to be outwardly released, propelled, or impelled off of or from the "centrifugally releasable fiber-engaging structures".

The immediate foregoing method preferably additionally comprises scrubbing the residual fibers in the second separation zone. At least one of the contiguous revolving cylinder assemblies comprises a wiping member. The centrifugally releasable fiber-engaging structures preferably comprise a plurality of generally identical fiber-engaging structures, such as a plurality of projections that may be spikes, rods or the like. Scrubbing of the residual fibers preferably comprises moving the residual fibers against a generally concave structure while the projections engage the residual fibers. The generally concave structure includes a plurality of openings, preferably having an average diameter ranging from about 1/8 inch to about 3/8 inch. In the alternative, the pulverized mixture, including the non-fibrous particulates and fibers, may also be scrubbed in the first separation zone by moving the same against a generally concave structure having grid rods spaced less than about 1/2 inch (e.g., from about 1/8 inch to about 3/8 inch) apart while the mixture-engaging structures engage the same. Over about 90% by weight of the non-fibrous particulates present in the original pulverized mixture are preferentially segregated into products containing <5% by weight residual fiber upon passage through the present invention. The concomitantly segregated fiber flowstreams are of sufficient quality as to represent saleable products.

The present invention also accomplishes its desired objects by broadly providing a method of separating non-fibrous particulates from fibers comprising:

(a) providing a pulverized mixture or composition comprising non-fibrous particulates adhered and/or admixed with fibers;

(b) introducing the pulverized composition into a first separation zone containing a plurality of revolving mixture-engaging structures so as to separate the fibers from the non-fibrous particulates and thereby produce a flowstream of partially cleaned non-fibrous particulates and a residual fiber flowstream; and (c) introducing the flowstream of partially cleaned non-fibrous particulates into a second separation zone containing a plurality of revolving cylinder assemblies having cylinder diameters of approximately equal measure and including fiber-engaging structures to further separate the remaining fibers therefrom and produce a flowstream of dually cleaned non-fibrous particulates and a second residual fiber flowstream.

The immediate foregoing method additionally preferably comprises passing the first and second residual fiber flowstreams through a countercurrently flowing fluid (e.g., air) to separate particulates therefrom. If air is the countercurrently flowing fluid, it may be produced by a blower or the like.

The present invention further also accomplishes its desired objects by broadly providing a method for separating elastomeric particles from fibers wherein at least some of the fibers are adhered to the elastomeric particles comprising:

a) introducing a pulverized elastomeric mixture or composition into a first separation zone to produce a separated flowstream of partially cleaned non-fibrous particulates and a residual fiber flowstream; and b) contacting the partially cleaned non-fibrous particulates in a second separation zone with a revolving mixture-engaging structure (e.g., a plurality of rods) to cause further removal of residual fibers and separate elastomeric particulates from the separated mixture, with the removed residual fibers having residual elastomeric particulates.

The present invention yet further accomplishes its desired objects by broadly providing a method for separating crumb rubber from fibers (e.g., polyester, nylon, etc.) comprising the steps of:

(a) introducing a pulverized mixture or composition of crumb rubber and admixed and/or adherent fibers (e.g., polyester, nylon, etc.) into a first separation zone containing a plurality of first revolving mixture-engaging structures to separate a portion of the fibers therefrom and produce separated flowstreams comprising primarily crumb rubber and residual fibers respectively; and (b) introducing the separated crumb rubber flowstream mixture of step (a) into a second separation zone containing a plurality of second revolving mixture-engaging structures including at least two contiguous revolving cylinder assemblies comprising centrifugal releasable fiber-engaging structures to further separate residual fibers from the crumb rubber.

Therefore, in accordance with one aspect of the present invention, a method of separating non-fibrous particulates and fibers from a pulverized composition comprises providing a pulverized composition including non-fibrous particulates and fibers and supplying the pulverized composition to a first stage of the first separator. The first stage comprises a plurality of first stage cylinders that include mixture-engaging structures. The method further comprises rotating the first stage cylinders and propelling the pulverized composition under the first stage cylinders with the cylinder's material-engaging structures and against separation means to thereby create a flowstream of partially cleaned non-fibrous particulates and a residual fiber flowstream. The method also comprises supplying the flowstream of partially cleaned non-fibrous particulates to a second separator. The second separator comprises a plurality of second separator cylinders that include material-engaging structures. The method further comprises rotating the second separator cylinders and propelling the partially cleaned particulates under the second separator cylinders with the mixture-engaging structures and against means for further separation of adherent and admixed fibrous material from non-fibrous particulates.

In accordance with another aspect of the present invention, a method of separating non-fibrous particulates and fibers from a pulverized composition comprises supplying the composition to the first stage of a first separator which comprises a plurality of cylinders that include material-engaging structures. The method further comprises rotating the cylinders and propelling the pulverized composition released from the cylinders against a plurality of grid bars to separate said composition into a flowstream of partially cleaned non-fibrous particulates and a residual fiber flowstream. The method also comprises supplying the flowstream of partially cleaned non-fibrous particulates to a second stage of the first separator that comprises a plurality of cylinders that include mixture-engaging structures, rotating the second stage cylinders and propelling the material released from the cylinders against a plurality of grid bars to separate said material into a flowstream of dually cleaned non-fibrous particulates and a second residual fiber flowstream. The method also comprises supplying the flowstream of partially cleaned non-fibrous particulates to a second separator that comprises a plurality of cylinders that include mixture-engaging structures, rotating the second separator cylinders whereby the material is brought into contact between the mixture-engaging structure of the second stage cylinders and a discontinuous surface (e.g., a surface with openings, apertures, or the like) to separate said material into a flowstream of multiply cleaned non-fibrous and a residual fiber flowstream.

In accordance with a further aspect of the present invention, the method further comprises the utilization of additional separator stages that comprise a plurality of cylinders that include mixture-engaging structures, rotating the cylinders and propelling the mixture to be released from the cylinders and brought into contact between the mixture engaging structure of the cylinders and discontinuous separation surface to thereby separate substantially clean fibers from non-fibrous particulates and residual fibers, the non-fibrous particulates and the residual fibers being optionally recycled back to a pulverizer or the like for grinding or pulverization for subsequent passage through the system again. The substantially clean fibers (e.g., polyester fibers, nylon fibers, etc.) are preferably supplied to a baling machine. The non-fibrous particulates preferably comprise crumb rubber.

In accordance with another aspect of the present invention, a system for separating non-fibrous particulates and fibers from a pulverized mixture comprises a first separator including a throughway bounded by a discontinuous separation surface for creating a partial separation of the non-fibrous particulates and adherent fibers into an intermediate mixture, and a plurality of first separator cylinders arranged in succession within the throughway. Each cylinder includes mixture-engaging structures. The system further includes a second separator in fluid communication with the first separator and comprises a throughway bounded by a discontinuous separation surface for further separating non-fibrous particulates from the intermediate mixture, and a plurality of second separator cylinders arranged in succession within the throughway. Each cylinder includes mixture-engaging structures.

In accordance with another aspect of the present invention, the first separator comprises multiple first separator stages in fluid communication with one another, each first separator stage including a throughway bounded by a discontinuous separation surface for creating an intermediate mixture of non-fibrous particulates and fibers and a plurality of first separator cylinders arranged in succession within the throughway, each cylinder including a mixture-engaging structure.

In accordance with a further aspect of the present invention, the structure for creating an intermediate mixture comprises a plurality of spaced grid bars.

In accordance with another aspect of the present invention, the mixture engaging structure of the first and second separator cylinders are projections and each cylinder further includes one or more outwardly extending wipers.

Accordingly, the present invention provides a system and method for separating non-fibrous particulates from adherent and/or admixed fibers (i.e. at least some of the fibers are adhered to the non-fibrous particulates) with which they are jointly present in the form of a pulverized mixture. Preferably, the pulverized mixture is produced from vehicle tires and comprises fibers and crumb rubber. The system and method of the present invention supply the pulverized mixture to a first separator section that separates non-fibrous particulates and fiber from the parental pulverized mixture and fibers from the particulate mixture and then supplies the non-fibrous particulates along with accompanying residual fibers, to a second separator section where the non-fibrous particulates are "cleaned" to further remove the residual fibers, thus providing substantiality clean non-fibrous particulates. In the preferred embodiment, these non-fibrous particulates consist essentially of crumb rubber. In more preferred embodiments, the fiber initially separated from the pulverized mixture is passed through one or more adjunct stages in the first separator, which further separate non-fibrous particulates from the fiber and supplies them to the second separator. Thus, substantially clean fiber, typically polyester or nylon, is provided by the system's first separator as a result of the method of the present invention and can be baled and used for other purposes.

Recapitulating, by way of example only, raw material may be fed by a belt or any other means into a feed control that provides temporary storage and also meters the raw material into the first part of the machine which is a three stage "first cleaning zone." Stage width is a variable and is dependent on the desired process rate. The raw material falls on top of a rotating cylinder which has spikes (fiber engaging structures) that rend and reorient the raw material thereby allowing some of the material (mostly rubber) to fall straight through to the grid bars below and on to the second separating zone. The cylinders propel the remaining raw material along the tops of several cylinders until it reaches the last cylinder which then carries the material. Scrubbing of the material occurs as it is transported by the cylinder across the grid surface, and then passed on to the next cylinder. After passage past all of the cylinders in stage one of zone one (2 or more, perhaps 7), the material is pneumatically conveyed through piping to a separator that is preferably a screen covered with fine mesh wire that restrains the material but lets the air go through. The material is then wiped off the screen and falls into a vacuum dropper that looks like a fan with non-metallic wipers that allows the material to escape the system without being under pressure. The partially clean fiber-rubber mixture then goes through second and third stages via the same procedure as stage one, being transported therebetween by means of comparable separator-dropper systems. Each stage discharges a flow-stream of rubber and residual fiber down through the grid bars. With the relative amount of fiber in the discharge rubber stream increasing with each subsequent cylinder (assuming the same relationships in terms of opening and speeds are maintained). The stages are all sequential. The opening size and geometry may be varied in order to improve cleaning. The mixture of rubber and some fiber that is input into the second zone is propelled over the top of the cylinders in one direction initially and then is reversed by the last cylinder and is propelled under the cylinders. The rubber is removed by means of the scrubbing action occurring to the partially cleaned rubber as it is abrasively contacted with the perforated (e.g. non-continuous) surfaces and allowed to fall to the bottom of the machine. The remaining fiber stream is pneumatically ejected and picked up with air. A small amount of air is pulled through separation zones one and two to prevent reentrainment of the processed material. In both zones, the fiber material that is ejected is pneumatically transported through a separation mechanism that due to differential in specific gravity, separates the large rubber particles from the fiber. The resulting fiber is then baled with the products of zone one and zone two either being separately classified, or combined. The rubber crumb after optional classification by size, is conveyed and boxed. The large pieces of rubber are conveyed and sold or recycled through a grinding or cryogenic process for recycling through the system.

It is therefore, an object of the present invention to provide a method for separating non-fibrous particulates, such as elastomeric particulates, from adherent and/or admixed fibers.

It is another object of the present invention to provide an apparatus or system for separating non-fibrous particulates and fibers from a pulverized mixture where such are present in potentially adherent contact.

These, together with the various ancillary objects and features which will become apparent to those skilled in the art as the following description proceeds, are attained by these novel methods and apparatuses and systems, a preferred embodiment thereof shown with reference to the accompanying drawings, by way of example only, wherein:

DETAILED DESCRIPTION OF THE PREFERRED EXEMPLARY EMBODIMENTS

Referring in detail now to the drawings wherein similar parts of the invention are identified by like reference numerals, there is seen a system 10 for receiving a pulverized mixture 11 including non-fibrous particulates 12 and fibers 13. System 10 is used for separating the non-fibrous particulates from the fibers, and is particularly suitable for receiving a pulverized mixture that has been created from used and discarded tires, scrap, buffings, etc. and thus, non-fibrous particulates 12 correspond generally to crumb rubber while the fibers 13 generally correspond to polyester or nylon or the like.

Pulverized mixture 11 results from having pulverized or ground a material (in a preferred embodiment, used tires) such that non-fibrous particulates 12 average in size preferably less than about 1/32 inch. Most preferably, the non-fibrous particulates 12 average in size less than about 1/64 inch. The stated nominal size of the particulates refers to the maximum dimension of the particulate through any axis. Thus, the term "less than about 1/32 inch particulate" represents a spherical particulate having a diameter less than about 1/32 inch or any geometric shape wherein the maximum transverse is less than about 1/32 inch. The term "average less than about 1/32 inch particulates" represents an average maximum dimension of less than about 1/32 inch for all particulates.

The pulverizing or grinding or comminuting of a material to produce pulverized mixture 11 may be accomplished in a suitable manner, such as by a suitable cryogenic pulverizing method that employs a hammer-mill or the like; chipping and/or shredding a material into small pieces followed by a grinding or similar process to produce particulates of desired dimension. The pulverized mixture preferably has a density ranging from about 5 pounds per cubic foot to about 30 pounds per cubic foot, and most preferably from about 10 pounds per cubic foot to about 15 pounds per cubic foot. The pulverized mixture preferably comprises from about 50 percent by weight to about 90 percent by weight of non-fibrous particulates 12, and more preferably, from about 60 percent by weight to about 80 percent by weight of non-fibrous particulates 12. If the pulverized mixture is from tires, the density of pulverized mixture 11 will typically range from about 10 pounds per cubic foot to about 15 pounds per cubic foot and will comprise from about 50 percent by weight to about 90 percent by weight crumb rubber. Crumb rubber from tires typically has a density ranging from about 20 pounds per cubic foot to about 30 pounds per cubic foot. Fibers from tires generally have a density ranging from about two pounds per cubic foot to about six pounds per cubic foot.

The system 10 comprises a housing 20 which preferably includes a primary separation zone or a first separator 23 and a secondary separation zone or second separator 24. An inlet chute 27 connects to housing 20 and communicates with first separator 23 to provide a path for introducing pulverized mixture 11 into first separator 23. Preferably, inlet chute 27 is a chute for gravity feeding a pulverized mixture into the primary separation zone. In one embodiment, first separator 23 includes multiple stages, with FIG. 2 portraying a system of three stages 25a, 25b, and 25c defined by partitions 28 and 29. Spacing of partitions 28 and 29 is dependent upon the process variables including recycle rate, composition of raw product and desired degree of cleanliness. In the exemplary embodiment of FIG. 2, partitions 28 and 29 create widths for stages 25a, 25b and 25c that are 2½ feet, 2½ feet, and 1 foot, respectively. In an alternative embodiment as portrayed in FIG. 6, the same effect of a multi stage separation zone can be achieved through the use of a single continuous series of spiked separation cylinders, the contact surfaces with which they bring the pulverized mixture into contact with may be varied as to gap spacing and type along the length of the separator.

Figure 2:
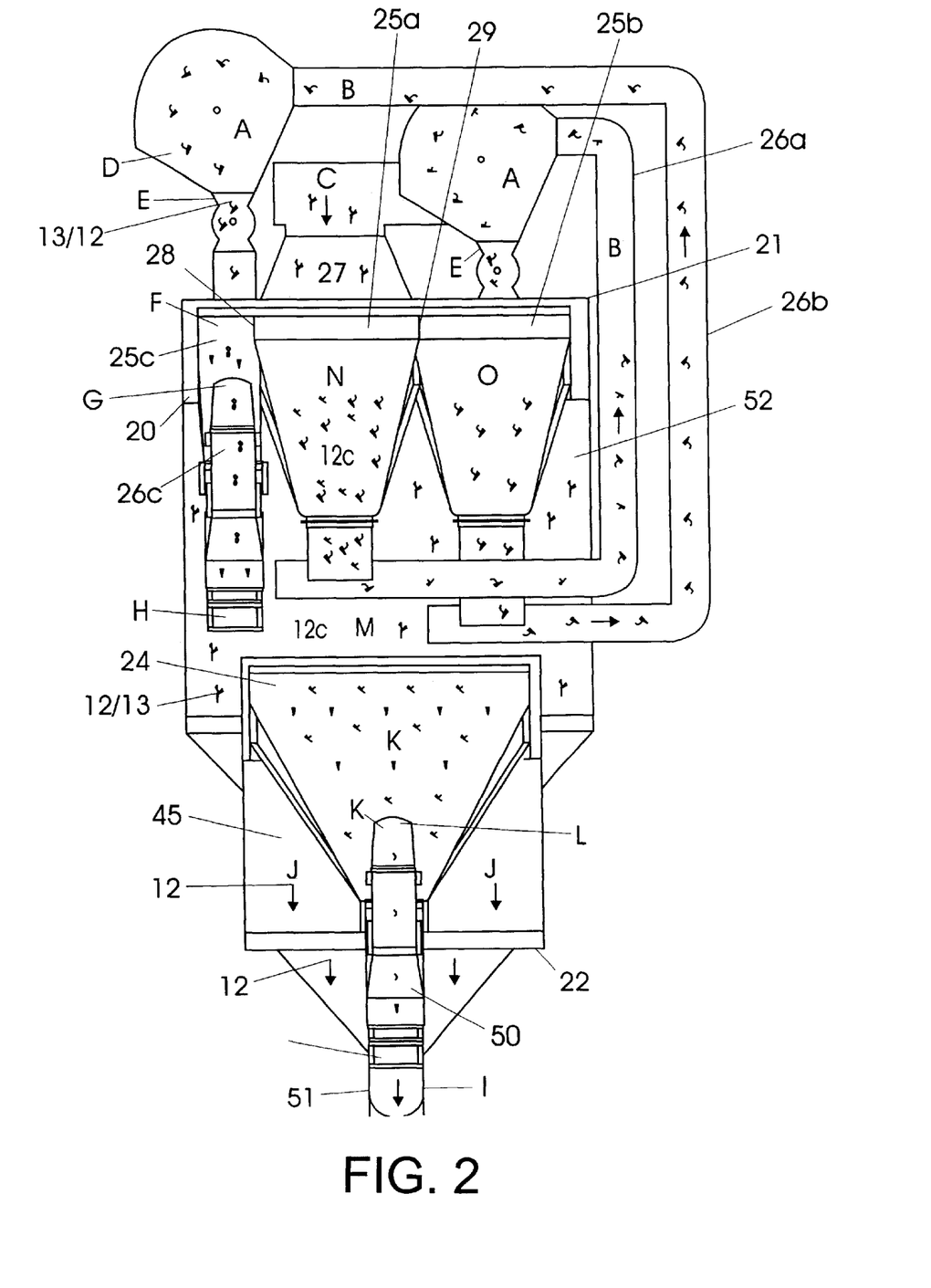
FIG. 2 is a front elevational view of a system for separating elastomeric particulates from a pulverized mixture in accordance with the present invention.
Figure 3:
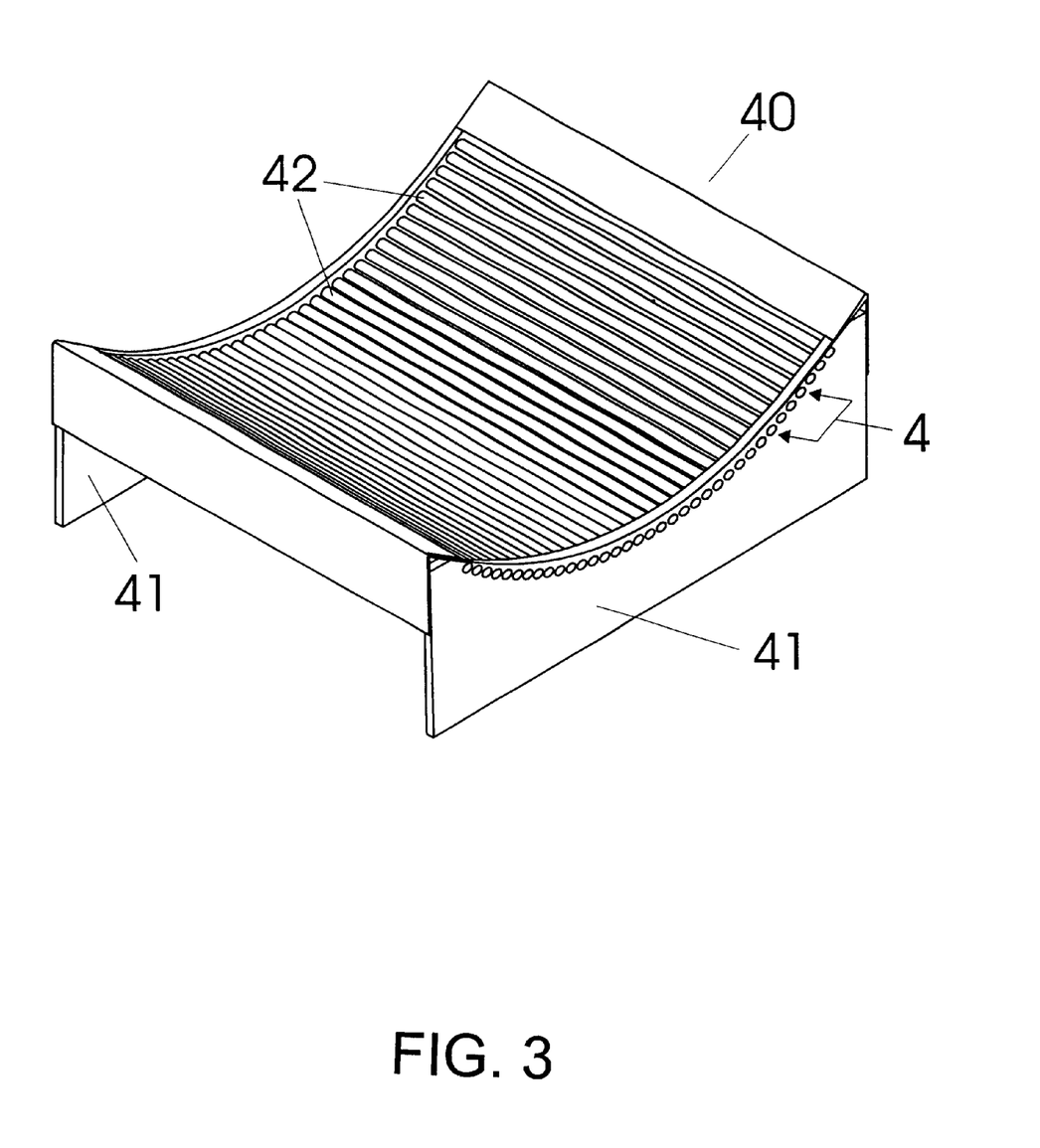
FIG. 3 is a partial enlarged perspective view of a concave grid-bar structure for the system illustrated in FIG. 1.
Figure 4:
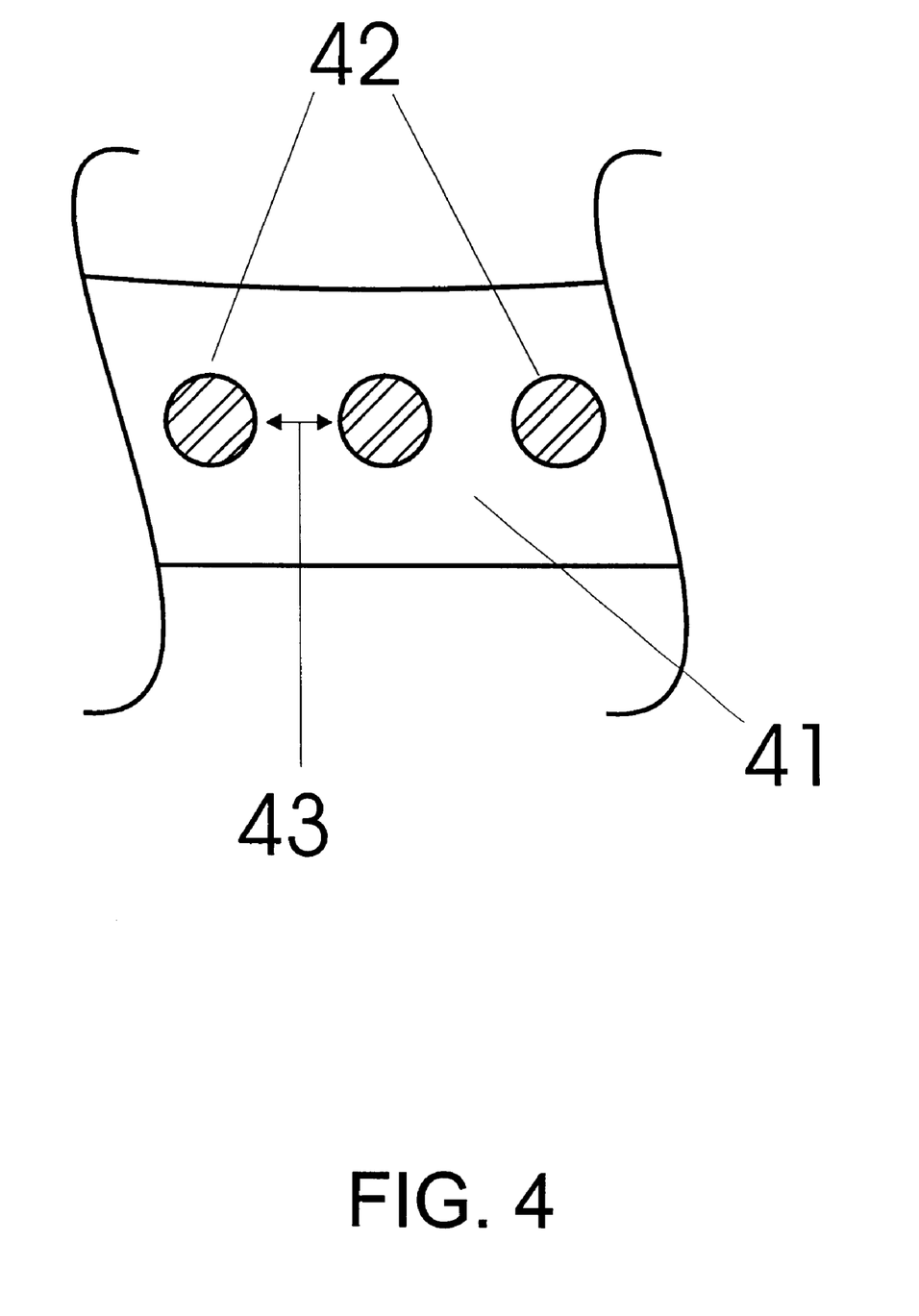
FIG. 4 is a vertical sectional view taken in the direction of the arrows and along the plane of line 4—4 and FIG. 3.

In FIG. 2, each stage 25a, 25b, 25c, of the first separator includes a respective transport duct 26a, 26b, 26c, that communicates with its corresponding stage for receiving fibers 13 and residual non-fibrous particulates 12 that have been separated from pulverized mixture 11. Transport duct 26a communicates with stage 25b to introduce fibers and residual particulates received from stage 25a therein while transport duct 26b communicates with stage 25c to introduce fibers and residual particulates from stage 25b therein. Finally, transport duct 26c delivers substantially clean fibers from stage 25c to a final processing station (not shown) such as a baling machine or a press. The substantially clean fibers are then propelled to joint (past separation geometry) 28a where they are pneumatically transported to the final processing station. Control of the air flow rate allows further separation of the non-fibrous particulates from fibers due to their differing specific gravity. The non-fibrous particulates will fall out of the air flow and exit through exit 29a. These non-fibrous particulates are optionally recycled back to a pulverizer or the like for grinding or pulverization for subsequent passage through the system again.

The first separator includes a series of cylinders 30 that extend through each stage 25a, 25b, 25c and that are rotatably supported by housing 20 while being rotatably driven by one or more motors (not shown). Each cylinder 30 has a plurality of projections (e.g., spikes, or rods) 31 protruding outwardly therefrom for contacting and engaging pulverized mixture 11 to separate fibers 13 from non-fibrous particulates 12 and to produce an intermediate mixture 12a of residual fibers 13r and non-fibrous particulates 12. Each cylinder 30 also preferably includes wipers 32. Rods 31 preferably have a length ranging from about one inch to about three inches and preferably possess a diameter ranging from about ¼ inch to about ¾ inch. Preferably, cylinders 30 revolve at from about 300 r.p.m. to about 1000 r.p.m.

Each stage 25a, 25b, 25c of first separator 23 defines a throughway 33a, 33b, 33c, respectively, each including separating surfaces 34. The throughways are connected to housing 20 such that separating surfaces 34 are disposed in close proximity to projections 31 of the cylinders 30. Preferably, the ends of projections 31 revolvingly pass above the separating surfaces at a distance ranging from about 1/8 inch to about one inch, while wipers 32 preferably pass the separating surfaces at a range from about 1/32 inch to about 1/16 inch. Separating surfaces 34 may be any suitable surface that is capable of cooperating with projections 31 to assist in separating non-fibrous particulates 12 from fibers 13 to produce non-fibrous particulates/residual fiber mixture 12a. Preferably, separating surfaces 34 are provided with openings wherethrough non-fibrous particulates 12 and intermediate mixture 12a pass after being separated from pulverized mixture 11. In a preferred embodiment of the present invention, separating surfaces 34 are concave with a discontinuous separation surface 40 as may be created by having a pair of generally parallel arcuate brackets 41 interconnected by a plurality of parallel spaced rods 42. Alternatively, separating surfaces 34 may be any alternate surface such as a concave screen or a perforated structure.

Spaced rods 42 are typically separated by an opening or space 43 that has a dimension preferably ranging from about 1/8 inch to about 3/4 inch. Rods 42 generally have a diameter ranging from about 1/4 inch to about 3/4 inch. As will be further explained herein below, revolving projections 31 of revolving spiked cylinders 30 contact the pulverized mixture 11 and engage fibers 13 that have entrained and/or adherent non-fibrous particulates 12. While projections 31 are engaged with pulverized mixture 11 and are being revolved, they rub and/or scrub the projection-engaged pulverized mixture 11 against spaced rods 42 of concave grid rod structures 40, thereby causing fibers 13 and entrained and adherent non-fibrous particulates 12 to separate from rod-engaged pulverized mixture 11. Separated non-fibrous particulates 12 and residual fibers 13r fall through spaces 43 between the contiguously spaced rods 42 thus creating intermediate mixture 12a.

Figure 5:
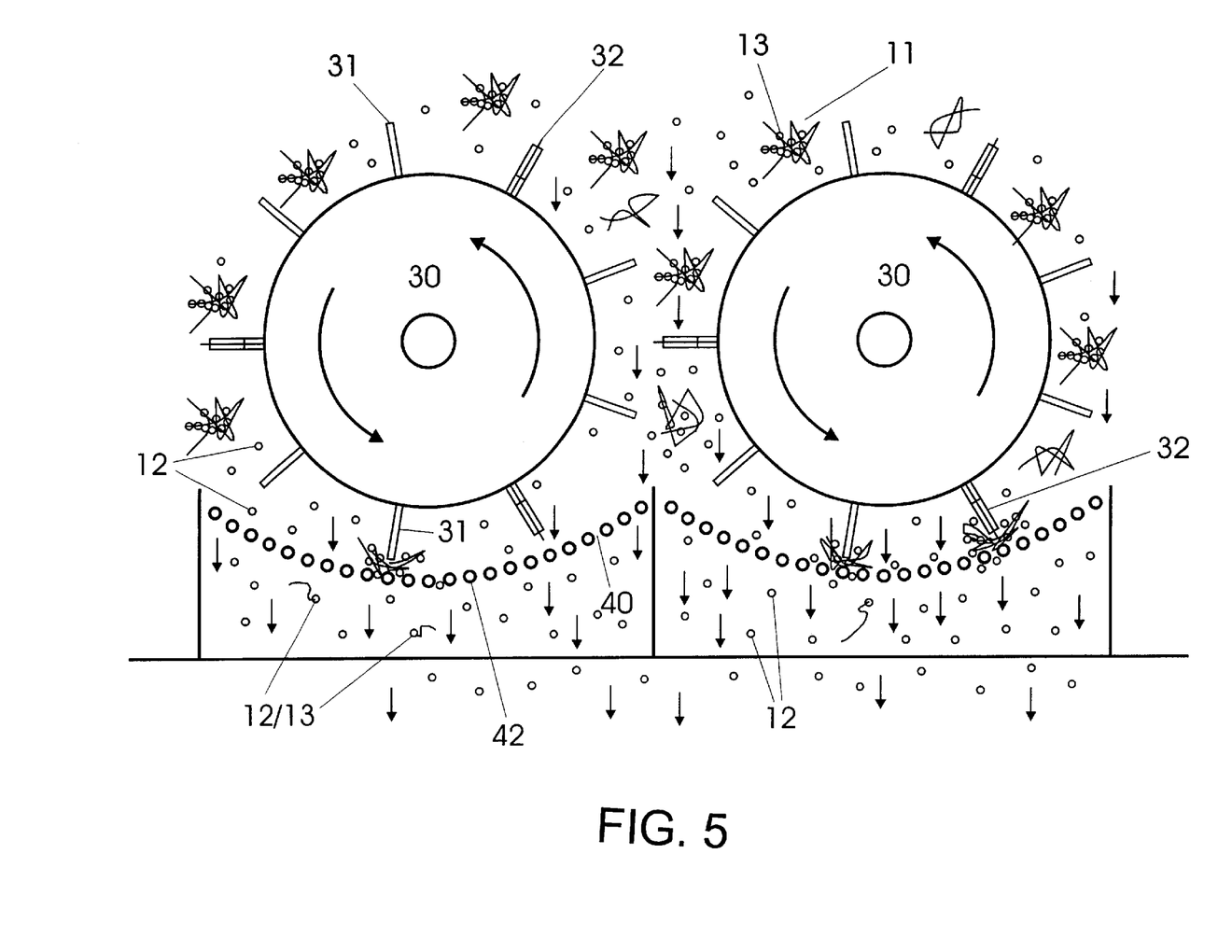
FIG. 5 is an enlarged end elevational view of a pair of rotating cylinders having rods protruding therefrom of the system of FIG. 1.

After pulverized mixture 11 has been scrubbed through the process of being brought into contact against spaced rods 42, revolving projections 31 throw or propel scrubbed pulverized mixture 11 onto revolving projections 31 of the next adjacent revolving spiked cylinder 30. The centrifugal force from the revolving projections causes pulverized mixture 11 to slide off the revolving projections and be engaged by the revolving projections of the adjacent revolving cylinder, as best shown in FIG. 5. Wipers 32 help scrub pulverized mixture 11 along separating surfaces 34 and propel any of pulverized mixture 11 that does not fall through spaces 43 to an adjacent cylinder 30. The process of scrubbing and subsequently propelling pulverized mixture 11 is continued until the last of the series of revolving cylinders 30 is reached, whereupon the remaining pulverized mixture, which at this point is primarily fibers and residual particulates, is passed into the corresponding transport duct depending on which stage the mixture is exiting. Transport ducts 26a and 26b feed the pulverized mixture to stages 25b and 25c, respectively, to further scrub or clean any residual non-fibrous particulates from the fibers, while transport duct 26c takes the substantially clean fibers produced by stage 25c to a final processing station. Hence, each stage 25a, 25b, 25c produces an intermediate mixture 12a consisting primarily of non-fibrous particulates 12 and residual fibers 13r. Stages 25a and 25b also produce intermediate mixtures 12b and 12c, respectively, consisting of fibers 13 and residual non-fibrous particulates 12r.

In a preferred embodiment of the present invention, the material exiting the first separator 23 includes fine clean fibers and large non-fibrous particulates. To separate the fine clean fibers from the large non-fibrous particulates, a fluid (e.g., air, etc.) is passed through opening 29a (see FIG. 1) such as to countercurrently flow against the fine clean fibers and the large non-fibrous particulates, causing the countercurrently flowing fluid or air to entrap and separate the fine clean fibers from the large non-fibrous particulates which are heavy enough such as not to be carried along with the fine clean fibers. The large non-fibrous particulates fall countercurrently through the flowing fluid or air and exit at opening 29a. The flowing fluid or air carries the fine clean fibers through duct 26c. When the flowing fluid is air, it is typically pressurized blowing air formed by a blower (not shown) or the like.

Figure 1:
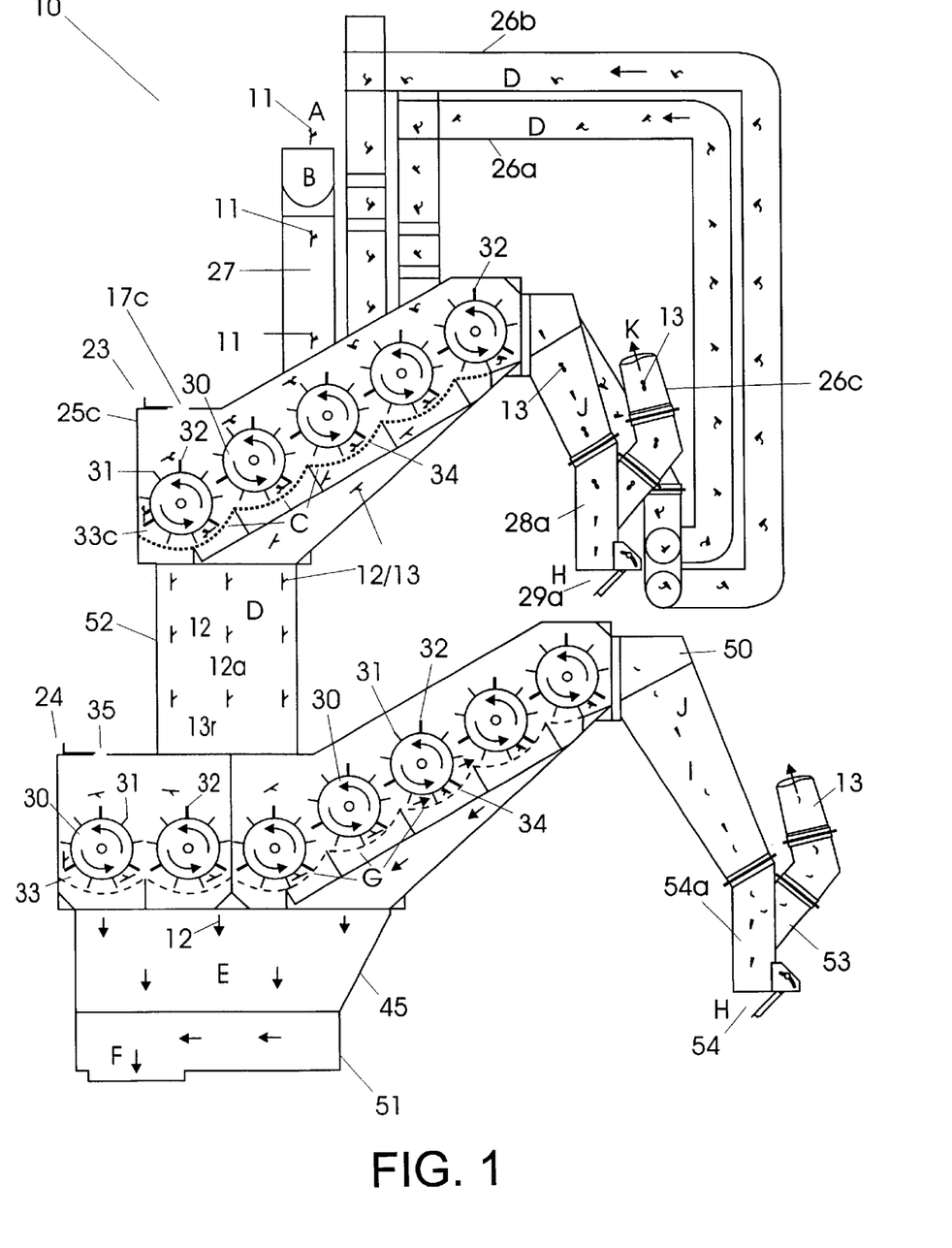
FIG. 1 is a side cross-sectional view of a system for separating elastomeric particulates from a pulverized mixture in accordance with the present invention.

The secondary separation zone 24 of system 10 receives intermediate mixture 12a that consists of non-fibrous particulates 12 and residual fibers 13r. The second separator may be substantially similar to stages 25a, 25b, 25c of first separator 23. Thus, second separator 24 contains a series of cylinders 30 that are rotatably supported by housing 20 for being rotatably driven by one or more motors (not shown). Each cylinder 30 has a plurality of outwardly extending projections 31 for contacting and engaging intermediate mixture 12a to separate residual fibers 13r from the non-fibrous particulates 12. Projections 31 preferably have a length ranging from about one inch to about three inches and a diameter ranging from about 1/4 inch to 3/4 inch. Preferably, cylinders 30 revolve at from about 300 r.p.m. to about 1000 r.p.m., and more preferably, from about 400 r.p.m. to about 800 r.p.m. Additionally, cylinders 30 include wipers 32. As can be seen in FIGS. 1 and 5, in the preferred embodiment, each cylinder 30 includes six rows of projections 31 interspersed with three wipers 32. The projections 31 may also be staggered axially within their rows. Additionally, for ease of manufacture, the wipers 32 may actually be connected to a row of projections 31 such that the cylinders 30 actually have nine rows of projections 31 with three wipers 32 coupled to three of the rows to achieve a desired arrangement of rows of projections 31 with wipers 32.

Second separator 24 also defines a throughway 33 having separating surfaces 34. In the preferred embodiment, separating surfaces 34 are concave perforated metal sections having perforation sizes ranging from about 1/8 inch to about 1/4 inch. Alternately, separating surfaces 34 may consist of concave grid-rod structures wherein spaced rods would be typically separated by an opening or space having a dimension ranging from about 1/16 inch to about 3/16 inch and most preferably having a spacing of about 1/8 inch. Such rods would generally have a diameter ranging from about 1/4 inch to about 3/4 inch. The rods may have a variety of shapes including, but not limited to, round, square, and triangular.

Figure 6:
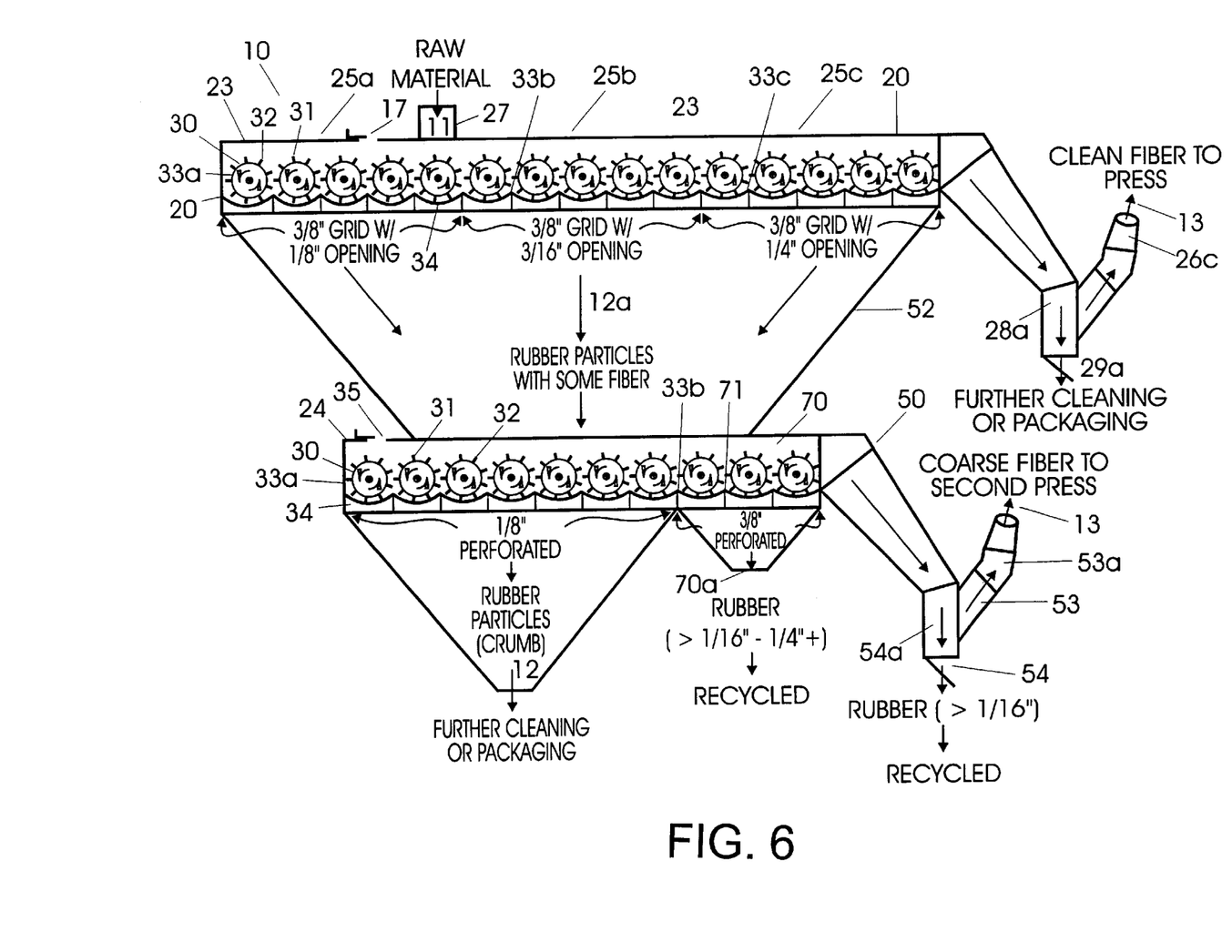
FIG. 6 is a side cross-sectional view of a system for separating elastomeric particulates from a pulverized mixture in accordance with another embodiment of the present invention.

In another preferred embodiment, second separator 24 has multiple sections and the perforation size range increases from section to section. In one such embodiment, a first section has a perforation size of 1/8 inch and a second section has a perforation size of 3/8 inch. Such an embodiment is illustrated in FIG. 6, which will be discussed in further detail herein.

Thus, intermediate mixture 12a enters second separator 24 and engages revolving cylinders 30. While projections 31 are engaged with intermediate mixture 12a and are being revolved by revolving cylinders 34, revolving projections 31 and wipers 32 rub and/or scrub intermediate mixture 12a against the discontinuous concave separating surfaces 34, thus causing non-fibrous particulates 12 to separate from residual fibers 13r, and pass through the perforated metal, exiting second separator 24 via exit 45 as substantially clean rubber. Once intermediate mixture 12a has contacted the last revolving cylinder 30, it exits second separator 24 via transport duct 50 as fiber with some large non-fibrous particles. A trap may be included at a proximal section of transport duct 50 for trapping coarse material such as rubber segments that exit second separator 24.

In a preferred embodiment of the present invention, the material exiting the second separator 24 at duct 50 includes coarse clean fibers and large non-fibrous particulates. To separate the coarse clean fibers from the large non-fibrous particulates, a fluid (e.g., air, etc.) is passed through opening 54 (see FIG. 1) such as to countercurrently flow against the coarse clean fibers and the large non-fibrous particulates, causing the countercurrently flowing fluid or air to entrap and separate the coarse clean fibers from the large non-fibrous particulates which are heavy enough such as not to be carried along with the coarse clean fibers. The large non-fibrous particulates fall countercurrently through the flowing fluid or air and exit at opening 54. The flowing fluid or air carries the coarse clean fibers through duct or bend 53. When the flowing fluid is air, it is typically pressurized suction air formed by a blower (not shown) or the like.

A small amount of air is pulled through the first and second separation zones to prevent small fibers from remaining entrained. Air is pulled through adjustable opening 17c and out duct 26c by a fan (not shown) for the first zone. Air is pulled through adjustable opening 35 and out duct 53 by a fan (not shown) for the second zone.

The adjustable valves or baffles at opening 29a and opening 54 are for the purpose of controlling air velocities in ducts 28a, 29a, 26c and 54a, 54 and 53; with this providing means for separation of materials by their specific gravities. This allows extraction of larger rubber particles from the system that are not physically compatible for extraction by means of the separation surfaces provided in the first and second zones.

After exiting second separator 24, the substantially clean rubber 12 may engage an auger 51 that is provided for assisting in its removal from system 10. This material may optionally be passed over a vibratory table for sizing of the non-fibrous particulates.

Thus, in overall operation, pulverized mixture 11 is introduced into first separator 23 of system 10 preferably through inlet chute 27. The introduction of pulverized mixture 11 may be in any suitable manner, such as gravity feeding, pneumatically, mechanically conveying, etc. Preferably, pulverized mixture 11 is introduced by gravity feeding through inlet chute 27 to minimize the amount of nonfibrous particulates 12 that become airborne.

In the figures, the arrows inside each cylinder 30 represent the direction of rotation of that cylinder, and hence the direction of rotation of projections and wipers attached thereon. Thus, as can be seen in the figures, cylinders 30 preferably rotate counterclockwise. Pulverized mixture 11 that enters first stage 25a of first separator 23 travels over the rotating cylinders and is propelled to the left of first stage 25a due to the counterclockwise rotation of the cylinders. Some of the pulverized mixture may fall in between the rotating cylinders. Pulverized mixture 11 then passes around the left most cylinder. It is then propelled under the rotating cylinders and brought into contact between the cylinder projection and the discontinuous concave separation structure 40.

As pulverized mixture 11 is propelled under the revolving cylinders and against the discontinuous concave separation structure 40, non-fibrous particulates 12 begin separating from pulverized mixture 11 and fall through spaces 43 into intermediate transport duct 52 thereby entering second separator 24. As discussed previously, pulverized mixture 11 continues moving through first stage 25a and by virtue of its transit past the multiple cylinder separation surface interfaces, gradually becomes a mixture consisting primarily of fibers and residual non-fibrous particulates. This intermediate mixture passes through transport duct 26a and passes into second stage 25b where even more non-fibrous particulates are separated out. The process is substantially the same as that previously described for first stage 25a. The intermediate mixture then passes through transport duct 26b and enters third stage 25c, which then processes the intermediate mixture in a manner similar to that described for the previous two stages. Finally, substantially clean fiber exits via exit duct 26c. Non-fibrous particulates 12 separated in stages 25b and 25c fall through openings 43 and enter intermediate duct 52 as part of intermediate mixture 12a. It is specifically noted that the first separator may be operated in alternate embodiments involving the use of any number of stages, with a preferred embodiment involving the use of a singular stage, as shown in FIG. 6.

Second separator 24 thus preferably receives intermediate mixture 12a via gravity feed. Intermediate mixture 12a passes over several of the rotating cylinders 30 moving to the left due to the counterclockwise rotation. Some of the intermediate mixture may fall in between the rotating cylinders. Intermediate mixture 12a passes around the leftmost cylinder 30 and is then propelled under rotating cylinders 30 and against the separating surface 34 that consists of a discontinuous surface, preferably perforated metal. The rotating cylinders then scrub the intermediate mixture against the perforated metal to separate out substantially clean, non-fibrous particulates 12 that pass through the perforated metal. Any intermediate mixture that does not pass through the perforated metal exits at the right side of second separator 24 through a duct 50 that pneumatically conveys the remaining intermediate mixture to separation zone 51 such that coarse fiber that has been separated from the intermediate mixture within the second separator is transported into exit duct 53 while material with greater specific gravity such as larger rubber particles with residual fiber possibly clinging thereto, drops by gravity through opening 54. The coarse fiber pneumatically pulled through exit duct 53 may be pneumatically or mechanically conveyed to a baling machine to be baled for future sale or use. The larger pieces of rubber that pass through opening 54 are generally comminuted and "recycled" into system 10.

FIG. 6 illustrates another preferred embodiment of a system 10 including input 27 wherein first separator 23 includes a single stage of three contiguous sections 25a, 25b, 25c, arranged in a linear relationship. Each section 25a, 25b, 25c, of first separator 23 defines a throughway 33a, 33b, 33c, respectively, each including separating surfaces 34. The throughways are connected to housing 20 such that separating surfaces 34 are disposed in close proximity to projections 31 of the cylinders 30. Preferably, the ends of projections 31 revolvingly pass above the separating surfaces at a distance ranging from about ⅛ inch to about one inch, while wipers 32 preferably pass the separating surfaces at a range from about 1/32 inch to about 1/16 inch. Separating surfaces 34 may be any suitable surface that is capable of cooperating with projections 31 to assist in separating non-fibrous particulates 12 from fibers 13 (not shown) to produce non-fibrous particulates/residual fiber (intermediate) mixture 12a. Preferably, separating surfaces 34 are provided with openings wherethrough non-fibrous particulates 12 and intermediate mixture 12a pass after being separated from pulverized mixture 11. Preferably separating surfaces 34 are concave.

In a preferred embodiment, separating surfaces 34 are defined by spaced rods having a ⅜ inch diameter. Such spaced rods are generally formed into grid-rod structures as previously described.

In a preferred embodiment, spaced rods of first stage 25a define a ⅛ inch opening, spaced rods of second stage 25b define 3/16 inch openings, while the spaced rods of third stage 25c define ¼ inch openings. As previously described, perforated materials or screening may be used instead of grid-rods. In such an embodiment, the perforated material or screening would preferably have openings similar to those described for the grid-rod structures.

In a preferred embodiment of the present invention, the material exiting he first separator 23 includes fine clean fibers and large non-fibrous particulates. To separate the fine clean fibers from the large non-fibrous particulates, a fluid (e.g., air, etc.) is passed through opening 29a (see FIG. 6) such as to countercurrently flow against the fine clean fibers and the large non-fibrous particulates, causing the countercurrently flowing fluid or air to entrain and separate the fine clean fibers from the large non-fibrous particulates which are heavy enough such as not to be carried along with the fine clean fibers. The large non-fibrous particulates fall countercurrently through the flowing fluid or air and exit at opening 29a. The flowing fluid or air carries the fine clean fibers through duct or bend 28a and exit 26c. When the flowing fluid is air, it is typically pressurized suction air formed by a blower (not shown) or the like.

As can be seen in FIG. 6, second separator 24 preferably is located below first separator 23 so that it can receive intermediate mixture 12a via gravity feed through intermediate duct 52. Alternately, second separator zone 24 may be located adjacent first separator 23. In such an embodiment, intermediate mixture 12a would need to be fed, for example mechanically, to second separator 24.

Second separator 24 also defines a throughway 33 having separating surfaces 34. Preferably, separating surfaces 34 are concave perforated metal sections having perforation sizes ranging from about 1/16 inch to about 3/16 inch, preferably about ⅛ inch. Alternatively, separating surfaces 34 may consist of concave grid-rod structures wherein spaced rods would be typically separated by an opening or space having a dimension ranging from about 1/16 inch to about 3/16 inch, and most preferably, having a spacing of about ⅛ inch. Such rods would generally have a diameter ranging from about ¼ inch to about ¾ inch.

Second separator 24 also includes an end stage 70 that defines a throughway 71, preferably consisting of perforated metal having perforation sizes ranging from about ¼ inch to about ½ inch, preferably about ⅜ inch. As intermediate mixture 12a (not shown) passes through second separator 24, pieces of substantially clean rubber that are too large to pass through the openings in the initial stage of second separator 24 may exit second separator 24 through the larger perforated openings in the end stage 70. These pieces of rubber are generally 1/16 inch to ¼ inch in size and are generally reprocessed through a pulverizer to be broken into smaller pieces. After this repulverizing process, they are then reentered into system 10 at the first separator 23.

Fiber that has been scrubbed from intermediate mixture 12a exits through separation zone 70 at the discharge end of the second separator 24 alone with pieces of rubber extractable through separation surfaces 34. The large rubber exits through exit 70a while the coarse fiber is pneumatically conveyed through separation zone 70, through duct 50 and around bend 54a where it then exits 53a and is preferably transported to a baling machine to be baled for future use or sale.

Substantially clean rubber exits second separator 24 as crumb rubber where it is then preferably transported to a vibratory table for sizing out.

In another preferred embodiment of the present invention, the material exiting the second separator 24 includes coarse clean fibers and large non-fibrous particulates. To separate the coarse clean fibers from the large non-fibrous particulates, a fluid (e.g., air, etc.) is passed through opening 54 (see FIG. 6) such as to countercurrently flow against the coarse clean fibers and the large non-fibrous particulates, causing the countercurrently flowing fluid or air to entrap and separate the coarse clean fibers from the large non-fibrous particulates which are heavy enough such as not to be carried along with the coarse clean fibers. The large non-fibrous particulates fall countercurrently through the flowing fluid or air and exit at opening 54. The flowing fluid or air carries the coarse clean fibers through duct or bend 53 where it exits through 53a. When the flowing fluid is air, the flowing air is a vacuum, pneumatically pressurized air having been created or formed by a blower (not shown) or the like. Air is pulled through adjustable opening 17c and out duct 26c by a fan (not shown) for the first zone. Air is pulled through adjustable opening 35 and out duct 53 by a fan (not shown) for the second zone.

Non-fibrous particulates 12 may be any type of particulates that are capable of being separated from pulverized mixture 11. Preferably, non-fibrous particulates 12 comprise elastomeric particulates, such as plastic particulates (e.g., polyethylene, polypropylene, etc.) or rubber particulates. The rubber particulates may include particulates of natural rubber such as vulcanized or unvulcanized polyisoprene; and synthetic rubbers, such as, for example, sodium polysulfide potychloroprene, butadiene-styrene copolymers (SBR), acrylonitrilebutadiene copolymers (nitrite rubber), ethylenepropylene-diene (EPDM) rubbers, synthetic isoprene, butyl rubber (copolymer of isobutylene and isoprene), polyacrylonitrile silicone (polysiloxane), and polyurethane.

Fibers 13 may be any type of fibers that are capable of being separated from pulverized mixture 11. Fibers 13 are typically characterized by relatively high tenacity that have a high ratio of length to diameter (e.g., often several hundred to one). Suitable fibers 13 include, for example, natural fibers, semisynthetic fibers, synthetic fibers and metal fibers. Natural fibers are animal, such as, for example, wool and silk (proteins); vegetable, such as, for example, cotton, (cellulose); and mineral (asbestos). Semisynthetic fibers include, for example, rayon, and inorganic substances extruded in fibrous form such as, for example, glass, boron, boron carbide, boron nitride, carbon, graphite, aluminum silicate, fused silica and some metals (steel). Synthetic fibers are generally made from high molecular weight polymers (polyamides, polyesters, acrylics, and polyolefins) by extruding from spinnerets. Metal fibers are generally made from suitable metals, such as, for example, tungsten, cobalt, tantalum and other metals, including alloys of the metals. Metal fibers also include steel fibers such as steel for tire cords.

In a preferred embodiment, pulverized mixture 11 is a mixture resulting from having triturated, pulverized or comminuted vehicle tires such as used automobile and truck vehicle tires. Vehicle tires are collected and chopped into tire pieces of desired dimensions such as two inch by two inch pieces. The tire pieces are then reduced in size, such as by cryogenic pulverizing and then reduced further by hammering, grinding, pounding, etc. into particulates having preferably a size of less than 400 microns. Generally, particulates range in size from 50 microns to 400 microns and larger. Fine size rubber particles are desired such that when recovered they are suitable for reuse in the manufacture of rubber articles. Those skilled in the art are aware that very finely divided rubber particles are essential if the crumb rubber product of tire comminution processes are to be sold to rubber and rubber application manufacturers.

The fibers produced from having pulverized vehicle tires are typically of polyester, comprising long chain synthetic polymers composed of an ester of a dihydric alcohol and terephthalic acid.

Thus, the present invention provides an efficient system and method for the simultaneous separation of non-fibrous particulates (especially crumb rubber) and fiber from a pulverized mixture, in a condition that is suitable for use. Hence, two useable products are efficiently retrieved from a pulverized mixture in such a way that they may be re-used again.

While the present invention has been described herein with reference to particular embodiments thereof, a latitude of modification, various changes and substitutions are intended in the foregoing disclosure, and it will be appreciated that in some instances some features of the invention will be employed without a corresponding use or other features without departing from the spirit and scope of the invention as set forth.

Many modifications may be made to adapt a particular situation or material to the teachings of the invention without departing from the essential spirit and scope of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A system for separating crumb rubber and fibers from a pulverized mixture, comprising:
    a) a first separator assembly including a plurality of rotatable first cylinders that include mixture-engaging structures and a pulverized mixture of crumb rubber and fibers engaged to said plurality of rotatable first cylinders; and
    b) a second separator assembly communicating with the first separator assembly and including a plurality of rotatable second cylinders that include centrifugally releasable mixture-engaging structure and a mixture of separated crumb rubber and residual fibers engaged to said plurality of rotatable second cylinders.

2. A system for separating non-fibrous elastomeric particulates and fibers from a pulverized mixture, the system comprising:
    a) a first separator assembly;
    b) a second separator assembly in fluid communication with the first separator assembly;
    c) said first separator assembly including a first throughway having a bottom comprising means for creating an intermediate mixture of non-fibrous elastomeric particulates and fibers, and a plurality of first separator cylinders arranged in succession within the first throughway, each of said first separator cylinders including a first mixture-engaging structure; and
    d) said second separator assembly including a second throughway having a bottom comprising means for separating non-fibrous elastomeric particulates from the intermediate mixture, and a plurality of second separator cylinders arranged in succession within the second throughway, each of said second separator cylinders including a second mixture-engaging structure.

3. The system of claim 2 wherein the first separator cylinders and the second separator cylinders include outwardly extending wipers.

4. A method for separating non-fibrous elastomeric particulates from fibers comprising:
    (a) providing a pulverized mixture comprising non-fibrous, elastomeric particulates and fibers, wherein at least some of the fibers are adhered to the elastomeric particulates;
    (b) introducing the pulverized mixture into a first separation zone containing a plurality of revolving mixture-engaging structures and a separating surface capable of cooperating with each of said revolving mixture-engaging structures to separate said fibers from said non-fibrous particulates and thereby produce a flowstream of partially cleaned non-fibrous particulates and a flowstream of residual fibers; and
    (c) introducing the flowstream of partially cleaned non-fibrous particulates into a second separation zone containing at least two contiguous revolving cylinder assemblies comprising centrifugally releasable fiber-engaging structures and a separating surface capable of cooperating with each of said fiber-engaging structures to further separate residual fibers from said partially cleaned non-fibrous particulates.

5. The method of claim 4 wherein at least one of said contiguous revolving cylinder assemblies comprises a wiping member.

6. The method of claim 4 wherein said centrifugally releasable fiber-engaging structures comprise a plurality of generally identical fiber-engaging structures.

7. The method of claim 6 wherein said fibers are adhered to said non-fibrous particulates and said plurality of generally identical fiber-engaging structures comprises a plurality of projections.

8. The method of claim 4 wherein said partially cleaned non-fibrous particulates produced in said first separation zone represent over about 90% by weight of said non-fibrous particulates from said pulverized mixture.

9. The method of claim 4 wherein said partially cleaned non-fibrous particulates in said second separation zone after said residual fibers have been separated therefrom by said fiber-engaging structures represent over about 95% by weight of said non-fibrous particulates from said pulverized mixture.

10. The method of claim 4 wherein said plurality of revolving mixture-engaging structures comprise centrifugally releasable fiber-engaging structures.

11. The method of claim 10 wherein said centrifugally releasable fiber-engaging structures comprise a plurality of projections.

12. A method of separating non-fibrous, elastomeric particulates from fibers comprising:
    (a) providing a pulverized mixture comprising non-fibrous, elastomeric particulates and fibers, wherein at least some of the fibers are adhered to the elastomeric particulates;

(b) introducing the pulverized mixture into a first separation zone containing a plurality of revolving mixture-engaging structures and a separating surface capable of cooperating with each of said revolving mixture-engaging structures to separate the fibers from the non-fibrous particulates and thereby produce a first residual fiber flowstream and a flowstream of partially cleaned non-fibrous particulates; and (c) introducing the flowstream of partially cleaned non-fibrous particulates into a second separation zone containing a plurality of revolving cylinder assemblies having cylinder diameters of approximately equal measure and including fiber-engaging structures and a separating surface capable of cooperating with each of said fiber-engaging structures to separate remaining fibers from the partially cleaned non-fibrous particulates and produce a flowstream of dually cleaned non-fibrous particulates and a second residual fiber flowstream.

13. The method of claim 12 additionally comprising passing the first residual fiber flowstream through a first countercurrently flowing fluid to separate non-fibrous particulates therefrom.

14. The method of claim 12 additionally comprising passing the second residual fiber flowstream through a second countercurrently flowing fluid to separate non-fibrous particulates therefrom.

15. The method of claim 12 wherein at least one of said contiguous revolving cylinder assemblies comprises a wiping member.

16. A method for separating elastomeric particles from fibers comprising:

(a) introducing a pulverized elastomeric mixture into a first separation zone to produce a separated mixture comprising elastomeric particulates and residual fibers, wherein at least some of the fibers are adhered to the elastomeric particles;

(b) contacting the separated mixture in a second separation zone with a first revolving mixture-engaging structure and a separating surface capable of cooperating with said first revolving mixture-engaging structure to cause the first revolving mixture-engaging structure and separating surface to remove residual fibers and separate elastomeric particulates from the separated mixture, with the removed residual fibers having residual elastomeric particulates; and (c) propelling the removed residual fibers in the second separation zone against a second revolving mixture-engaging structure and a separating surface capable of cooperating with said second revolving mixture-engaging structure to cause the second revolving mixture-engaging structure and separating surface to engage the removed residual fibers and separate residual elastomeric particulates from the removed residual fibers.

17. A method for separating crumb rubber from fibers comprising the steps of:

(a) introducing a pulverized mixture of crumb rubber and fibers into a first separation zone containing a plurality of first revolving mixture-engaging structures and a separating surface capable of cooperating with each of said first revolving mixture-engaging structures to separate a portion of the fibers from the pulverized mixture and produce a separated mixture comprising crumb rubber and residual fibers, wherein at least some of the fibers are adhered to the crumb rubber; and (b) introducing the separated mixture of step (a) into a second separation zone containing a plurality of second revolving mixture-engaging structures and a separating surface capable of cooperating with each of said second revolving mixture-engaging structures including at least two contiguous revolving cylinder assemblies comprising centrifugal releasable fiber-engaging structures to remove the residual fibers from the crumb rubber.

18. The method of claim 17 wherein said at least two contiguous revolving cylinder assemblies have cylinder diameters of approximately equal measure.

19. The method of claim 17 wherein said first revolving mixture-engaging structures and said second revolving mixture-engaging structures revolve in the same direction.

20. The method of claim 17 wherein said fibers comprises fibers selected from the group consisting of polyester fibers, nylon fibers and mixtures thereof.

* * * * *